United States Patent [19]

Peck et al.

[11] Patent Number: 4,541,054
[45] Date of Patent: Sep. 10, 1985

[54] DETERMINING AN OPERATING PATH OF A TOOL IN RELATION TO A THREE-DIMENSIONAL SURFACE OF A WORKPIECE

[75] Inventors: Alan M. Peck, Beverly, Mass.; David C. Reedman, Grantham, England; Frederick J. Graveling, Aylestone, England; David Moore, Nuneaton, England; Graham J. Mansfield, Oadby, England

[73] Assignee: USM Corporation, Farmington, Conn.

[21] Appl. No.: 606,957

[22] Filed: May 4, 1984

Related U.S. Application Data

[63] Continuation-in-part of Ser. No. 535,433, Sep. 26, 1983, which is a continuation of Ser. No. 270,790, Jun. 5, 1981.

[30] Foreign Application Priority Data

Jun. 10, 1980 [GB] United Kingdom ............... 8019007

[51] Int. Cl.³ ............................................ G05B 19/42
[52] U.S. Cl. .................................... 364/474; 318/568
[58] Field of Search .................. 12/77; 364/474, 475, 364/468, 193, 191; 318/568, 567; 69/6.5

[56] References Cited

U.S. PATENT DOCUMENTS 3,920,972 11/1975 Corwin, Jr. et al. ............... 364/513
4,136,306 1/1979 Westlund et al. .................. 318/568
4,233,550 11/1980 Berger et al. ..................... 318/568
4,287,459 9/1981 Dahlström ...................... 364/478 X
4,391,011 7/1983 Peck et al. ............................ 12/1 B Primary Examiner—James D. Thomas
Assistant Examiner—William G. Niessen
Attorney, Agent, or Firm—Aubrey C. Brine

[57] ABSTRACT

For determining a path of movement of a tool along shoe bottom marginal portions a series of points along such path is selected and information regarding such points stored in the form of digitized co-ordinate axis values by a computer, from which information the path can subsequently be derived. The selected points are spaced by a predetermined distance (which may be the same for each pair of adjacent points) regardless of shoe bottom contour. To this end, when each point is digitized, the tool and shoe bottom are relatively moved apart by the predetermined distance along a first axis, extending heightwise of the shoe bottom. Thereafter in returning the tool and shoe bottom into engagement along said one dimension under operator control, appropriate compensating movement also takes place automatically along a lengthwise axis and/or along a widthwise axis. In addition, relative movement may also be effected between the tool and surface under operator control along said widthwise axis, compensating movement then automatically taking place along said lengthwise axis. In either case, the compensating movement serves to maintain the predetermined distance between the tool and the workpiece surface.

5 Claims, 7 Drawing Figures

Fig_1

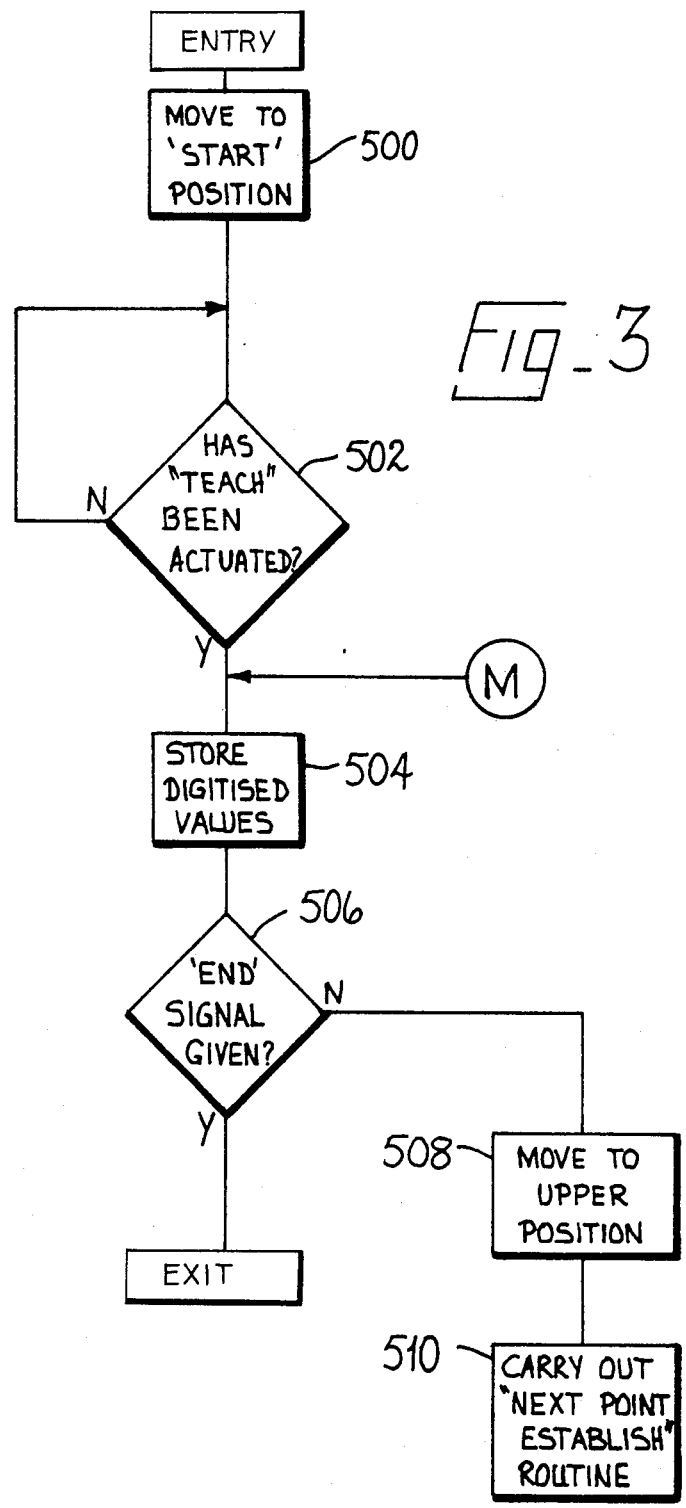

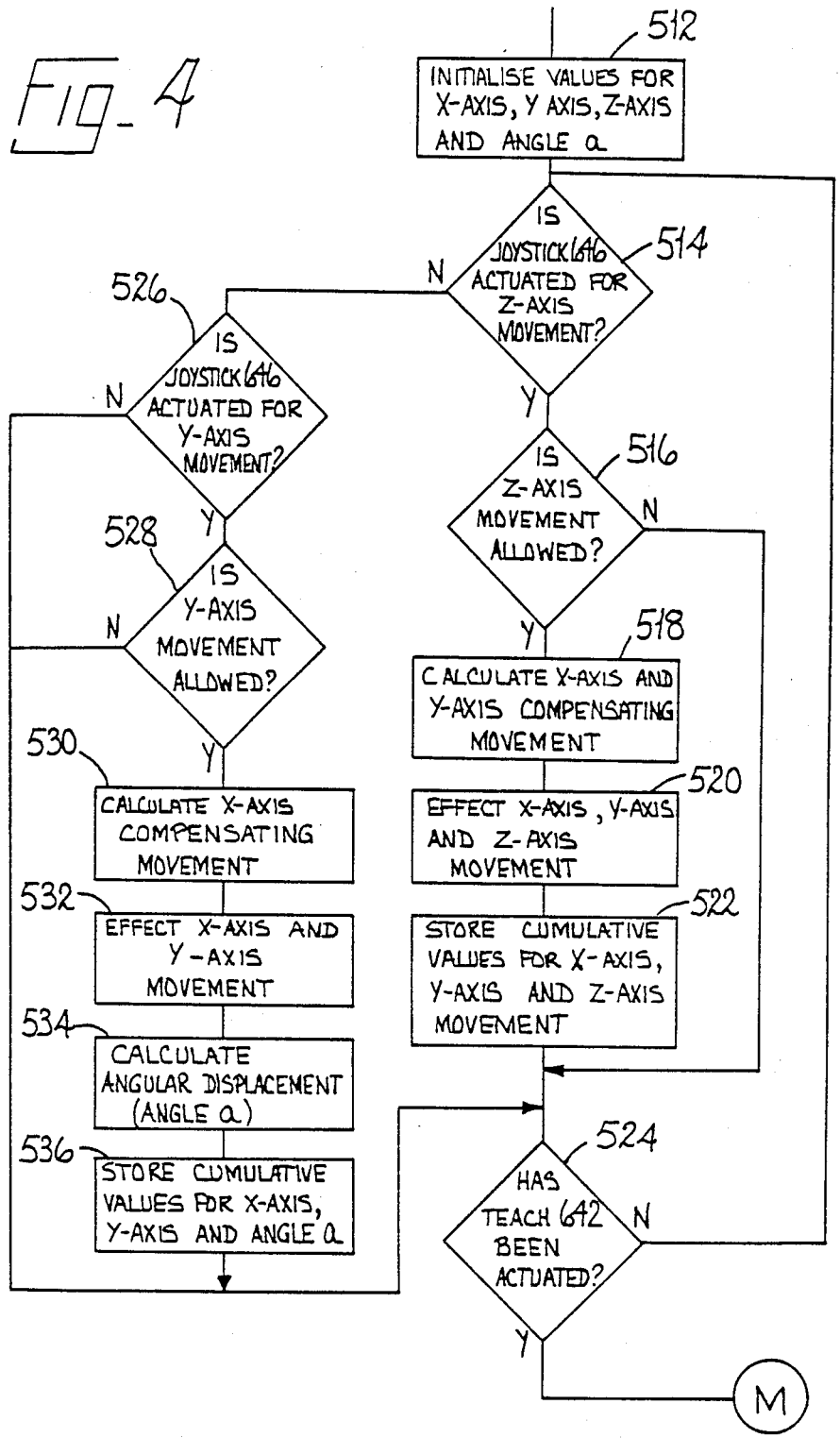

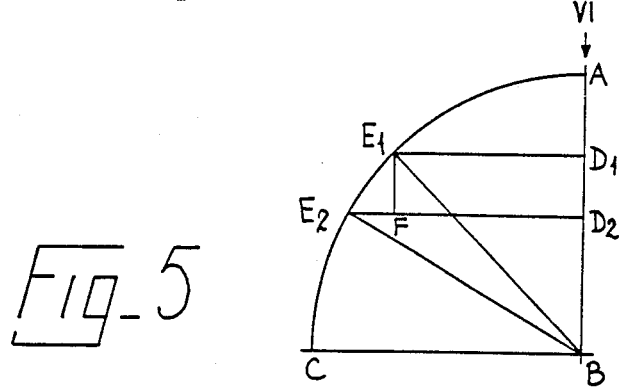
Fig_5
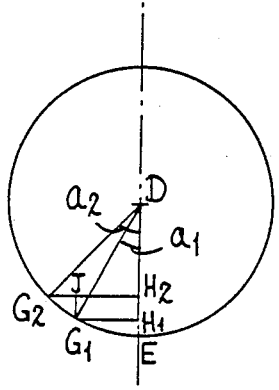
Fig_6
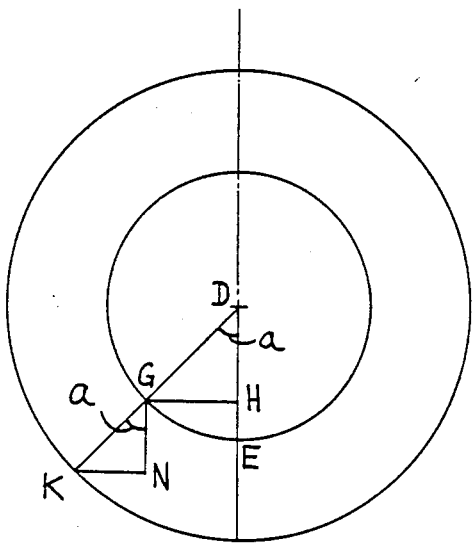
Fig_7

DETERMINING AN OPERATING PATH OF A TOOL IN RELATION TO A THREE-DIMENSIONAL SURFACE OF A WORKPIECE

This is a continuation-in-part of continuation application Ser. No. 535,433 filed Sept. 26, 1983, now abandoned, of parent application Ser. No. 270,790, filed June 5, 1981, now abandoned.

BACKGROUND OF THE INVENTION (1) Field of the Invention

This invention relates to a method of determining an operating path of a tool in relation to a surface of a workpiece, wherein a plurality of points of contact between a tool and the workpiece surface are determined and information in the form of digitised co-ordinate axis values relating to each determined point of contact is stored in a computer memory device, from which a set of co-ordinate axis values an operating path for the tool can be derived.

(2) Summary of the Prior Art

In U.S. Pat. No. 4,136,306 is disclosed a sewing machine for digitising a predetermined pattern and thereafter stitching the predetermined pattern on a workpiece, in the use of which machine a model pattern is moved under operator control along co-ordinate x and y axes successively to bring so-called "stitch points" into an appropriate relationship with an operating tool, the stitch points thus constituting points of contact between the tool and the workpiece surface. In operation, in such machine, furthermore, the operator uses a so-called "joy stick switch" which generates signals and supplies them to a computer which serves to convert the signals to drive signals for motors by which the x and y axis movement is effected. When each stitch point is properly aligned with the tool, furthermore, the co-ordinate axis values can be digitised and stored in the computer memory, and from the set of co-ordinate axis values thus obtained the operating path of the tool in relation to the workpiece surface can be derived.

Whereas the aforementioned method of digitising a pre-determined pattern has been found to be satisfactory where a prepared model pattern is supplied, the method described does not in any way assist in the determination of the location of the successive points of contact, still less the spacing between them. The method is therefore limited in its application in that a prepared model pattern is required for each style of workpiece to be operated upon. In addition, while said method has proved satisfactory for use with two-dimensional workpieces, the preparation of a model pattern for a three-dimensional surface, e.g. a shoe bottom, would be time-consuming and generally lead to greater difficulties than envisaged with a two-dimensional surface.

It is thus the object of the present invention to provide a method for determining each point of contact between a tool and a workpiece surface and for controlling the spacing between adjacent points, specifically for use with a method of determining an operating path of a tool in relation to such surface.

SUMMARY OF THE INVENTION

The present invention provides the improvement consisting in a method for determining each point of contact between a tool and a workpiece surface and for controlling the spacing between adjacent points, said method comprising the steps of (i), starting from a point of contact (constituted by a last preceding stored point) of the tool and the workpiece surface, effecting relative movement between the tool and the workpiece surface out of such contact through a predetermined distance along a first axis, and thereafter (ii) returning the tool and the workpiece surface into contact selectively (a) along said first axis, compensating relative movement taking place automatically along a second axis and/or a third axis such that the tool describes a great circle of a sphere of which the starting point of contact forms the center, or (b) along said third axis, compensating relative movement taking place automatically along said second axis such that the tool describes a small circle of such sphere, whereby the tool is maintained, and the next-to-be-stored point of contact is thus spaced, at the predetermined distance from the starting point of contact, regardless of the contour of the workpiece surface.

It will thus be seen that, using this method in accordance with the invention, a series of spaced apart points of contact can be determined automatically by the machine and further that the method is capable of operation regardless of whether the workpiece surface is substantially flat (2-dimensional) or significantly contoured (3-dimensional).

It will of course be appreciated that using this method once the tool and workpiece surface have been separated by the predetermined distance, it is desirable to provide some restriction whereby relative movement therebetween cannot take place where the effect would be to separate the tool and the workpiece surface by a distance greater than the predetermined distance.

By using the method in accordance with the invention, the spacing of the successive points is controlled with a result that, in subsequent operating cycles of the machine, by also controlling the time taken to move from one point to the next succeeding point, the feed speed of the tool in relation to the workpiece surface can be controlled during the determining of the operating path of the tool. Thus, for example, where a constant velocity is required it is merely necessary to ensure that the distance between adjacent points is the same in every case. On the other hand, if different speeds are required, then this can be achieved by varying the predetermined distance in the path determining operation. In order to achieve the desired result, preferably the predetermined distance is set by the operator for each next-to-be-digitised point.

It will be appreciated that if the tool and/or the workpiece surface is to any extent compressible the relative position between the tool and surface when moved to a point to be digitised may vary according to the pressure applied therebetween. Thus, preferably in carrying out the method in accordance with the invention, as the tool and the workpiece surface are urged into contact with one another, a predetermined load is applied thereto. Furthermore, preferably the predetermined load is constant for each point.

The method in accordance with the invention has been found to be especially, but not exclusively, suitable for determining the path of a roughing tool by which marginal portions of the bottom of a lasted shoe can be roughed, prior to the attachment by adhesive to such shoe bottom of a sole unit. Furthermore, in such a case, conveniently the first axis extends heightwise, the second lengthwise and the third widthwise of the shoe bottom.

It has also been found convenient to use the tool which is to perform an operation upon the workpiece surface as the tool to be used for determining the operating path.

BRIEF DESCRIPTION OF THE DRAWINGS

There now follows a detailed description, to be read with reference to the accompanying drawings, of one method in accordance with the invention, this method having been selected for description merely by way of exemplification of the invention and not by way of limitation thereof.

In the accompanying drawings:

FIG. 3 is a flow diagram indicating a "digitise" routine of the method in accordance with the invention;

FIG. 4 is a flow diagram of a "next point establish" routine of the method in accordance with the invention; and FIGS. 5 to 7 are diagrams to assist in explaining certain calculations carried out in connection with the method in accordance with the invention.

DESCRIPTION OF THE PREFERRED EMBODIMENT

Figure 1:
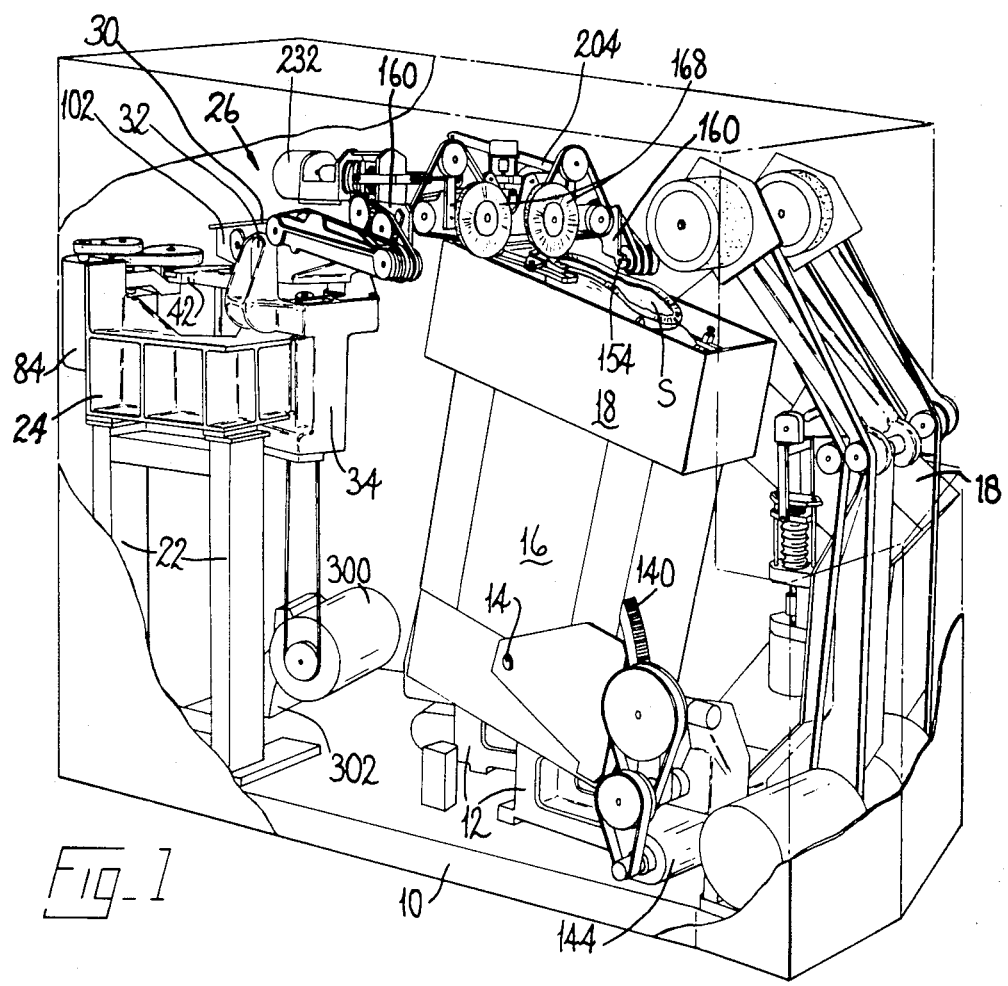
FIG. 1 is a left hand perspective view of a shoe bottom roughing machine in which the method in accordance with the invention can be used.
Figure 2:
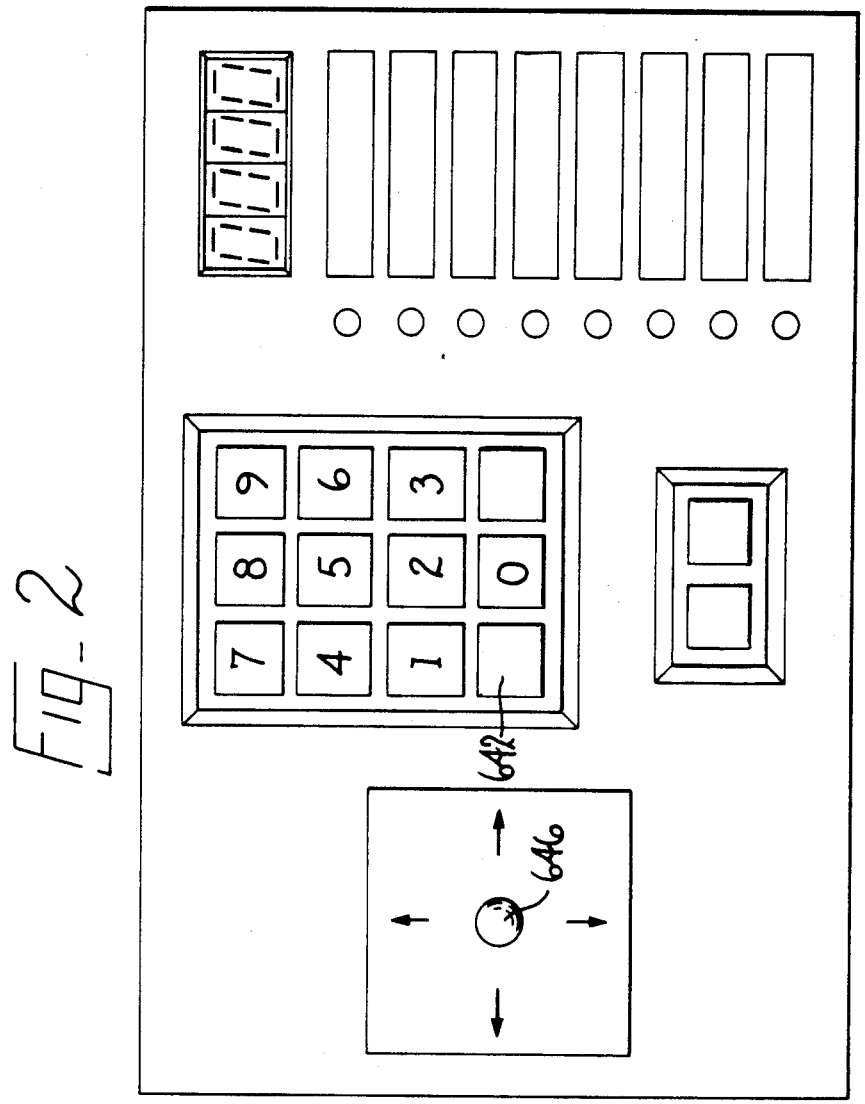
FIG. 2 is a diagram indicating the layout of a control panel of such machine.

The method in accordance with the invention now to be described is for use in a machine which is suitable for use in performing a roughing operation progressively along marginal portions of shoe bottoms. Such a machine is described in detail in U.S. Pat. No. 4,391,011 assigned to the present assignee. For the purpose of the present application appropriate parts of such machine are illustrated in FIGS. 1 and 2 wherein it can be seen that the machine comprises a base 10 on which are mounted two upstanding brackets 12 each supporting a pivot shaft 14, each shaft carrying a structure 16 on which a shoe support 18 is carried. Each shoe support 18 is arranged to support a shoe S carried thereon, bottom uppermost, with the toe end thereof facing towards the front of the machine i.e. towards the operator. Although in the machine here described two shoe supports are provided, in other similar machines only one such shoe support may be provided. Towards the rear of the base 10 is also mounted a support column structure 22 supporting a horizontal web structure 24 by which tool supporting means generally designated 26 is carried, said means comprising a bifurcated arm 30 by which two rotary radial roughing brushes 168 are supported side-by-side. The brushes are caused to rotate in contrary directions such that each brush effects an inwiping action on the marginal portion of the bottom of a shoe as it is caused to operate progressively therealong. For rotating the brushes, an electric motor 300, supported by a bracket 302 on the base 10, is operatively connected thereto through a series of belts and pulleys. The arm 30 is supported, for pivotal movement about a horizontal pivot, in upstanding lugs 32, one arranged at either side of the arm 30, of a support casting 34, which is itself supported above and below the web structure 24, for pivotal movement about a vertical pivot. It will thus be appreciated that, in the operation of the machine, either one of the shoe supports 18 can pivot about its shaft 14 to move a shoe S supported thereby in a direction extending generally lengthwise of the bottom of the shoe, while the tool supporting means is capable of pivotal movement about two axes thus to move the tools 168 supported thereby widthwise and heightwise of the shoe bottom, as the shoe support is moved as aforesaid.

For the purpose of this specification, movement of the shoe support 18 will be referred to hereinafter as "x-axis" movement, that of the tool about the vertical pivot as "y-axis movement" and about the horizontal pivot as "z-axis movement". For effecting such movements, furthermore, the machine comprises, for each shoe support 18, a first (x-axis) stepping motor 144 mounted on the base 10 and effective, through a series of pulleys and belts and through a toothed segment 140 mounted on its associated support structure 16, to cause x-axis movement of the shoe support 18 to take place about the shaft 14. Also, the machine comprises a second (y-axis) stepping motor 84 which is carried by the web structure 24 and is effective, through a toothed segment 42, to cause y-axis movement of the support casting 34, and thus of the brushes 168 mounted on the arm 30, about the vertical pivot on the web structure 24. Again, the machine comprises a third (z-axis) stepping motor (not shown) which is supported by the support casting 34 rearwardly of its vertical pivot and acts on a rearwardly extending portion 102 of the arm 30, thus to cause z-axis movement of the brushes 168 mounted on said arm 30 about its horizontal pivot in the support casting 34.

The arm 30 of the tool supporting means 26 also supports, for pivotal movement thereon about a horizontal pivot defined by pins 154, a cradle 160 (forming part of the tool supporting means) on which the brushes 168 are carried, said horizontal pivot being arranged to pass through the operating surface of each brush 168 in the region of its area engaging the shoe bottom when the machine is in use. Pivoting the cradle 160 is this manner enables the plane of each radial brush to be maintained normal, or substantially normal, to the shoe bottom portion being operated upon. For so pivoting the cradle, the machine comprises a fourth stepping motor 232 operatively connected by a rod 204 to said cradle 160.

The machine also comprises computer control means which, in the operation of the machine, is effective to control the relative positioning of the shoe bottom and the roughing brushes 168, lengthwise, heightwise and widthwise of the shoe bottom, as the brushes are caused to operate progressively along opposite marginal portions of the shoe bottom. This is achieved by generating and supplying control pulses to each of the stepping motors, in accordance with a programmed instruction, including digitised co-ordinate axis values, using three co-ordinate axes, for a plurality of successive selected points along the marginal portion to be operated upon of the shoe bottom, such digitised information being stored in a memory of the computer. In addition, the computer supplies control pulses to the stepping motor 232 for causing the cradle 160 to pivot as aforesaid. Furthermore, the computer may have a grading programme which is effective to vary the operating path of the tools appropriately to the length of the shoe being operated upon.

For determining the operating path of the tool in relation to the shoe bottom, the various stepping motors of the machine and also the computer control means thereof are utilised using a "model" shoe, that is to say a shoe which has not been specially prepared but which usually will be in the middle of the expected size range for the style. This shoe is loaded into one of the shoe supports 18 and relative movement is effected between the brushes 168 and such shoe under the control of the operator, selected points of contact between each brush and the shoe bottom being digitised using the computer control means and stored in the form of digitised co-ordinate axis values in the computer memory.

For assisting in carrying out the method in accordance with the invention, furthermore, the machine also comprises operator-controlled means comprising a manually operable control device (see FIG. 2) having a control panel including a keyboard generally designated 640, "number" buttons (from 0 to 9), and a "teach" button 642. In addition, the control panel has joy stick 646 by which y-axis and z-axis movement of the tool supporting means 26 can be effected in relation to the shoe bottom, in opposite directions, under operator control, and which is movable in four directions, viz. two heightwise (z-axis) directions and two widthwise (y-axis) directions.

More particularly, and in carrying out the method in accordance with the invention, the appropriate brush 168 and the leading, heel end, portion of the shoe bottom are first moved to a start position, constituting an initial starting point of contact, which is then digitised and stored as aforesaid. In the machine above described, such digitising and storing is effected by actuation of the "teach" button 642, which also causes the tool to be moved, out of contact with the surface of the shoe bottom, by a predetermined distance (d) from said starting point, along the z-axis, which extends heightwise of the shoe bottom. This z-axis movement may be conveniently viewed as moving the tool from the center of a sphere, which center is defined by the starting point, to the surface of the sphere, the sphere having a radius equal to the predetermined distance (d). Thereafter, in carrying out said method, the tool 168 is returned along the z-axis and/or along the y-axis under operator control so as to bring the tool once again into contact with the shoe bottom. In response to such return movement along the z-axis, simultaneously corresponding x-axis and y-axis movement of the shoe support 18 takes place automatically, will be referred to hereinafter. Similarly, in response to y-axis movement under operator control, simultaneously x-axis movement of the shoe support 18 takes place automatically. In both instances the automatically controlled movement is effective to maintain the predetermined distance (d) between the tool 168 and the starting point. In this manner, the movement of the tool in relation to the shoe bottom may be regarded as maintaining the tool on the surface of the sphere referred to hereinbefore. The tool and the surface are thus brought into contact once more at a further point, spaced from the starting point by the predetermined distance (d) regardless of the contour of said surface, and this further point can then be digitised and stored in the computer memory. In addition, this further point constitutes the starting point for the next point of contact to be determined.

More particularly in carrying out the method in accordance with the invention, the operator first causes the tool to be lowered, from the position (at the "top" of the sphere) to which it has been automatically moved upon the last actuation of the "teach" button 642, along the z-axis towards the shoe bottom. (Because the tool is initially at the "top" of the sphere, no y-axis movement is "allowed" at this time.) Simultaneously the shoe support is moved along the x-axis automatically thus to maintain the distance between the tool and the starting point on the shoe bottom at said predetermined distance from one another. Once an appreciable amount of z-axis movement has taken place, the operator may, again using the joy stick, cause y-axis movement of the tool to take place. Simultaneously, x-axis movement of the shoe support will be automatically effected to maintain the spacing between the tool and the starting point. Thereafter, as will be explained hereinafter, any further z-axis movement will be compensated for not only by automatically effected x-axis movement of the shoe support, but also by automatically effected y-axis movement of the tool. When a further point of contact between the tool and shoe bottom has been reached, and further the operator is satisfied that the selected point will lie on a desired operating path of the tool relative to the shoe bottom in an operating mode of the machine, he actuates the "teach" button 642, whereby digitised information concerning the relative position of the tool and shoe bottom is generated and stored by the memory device of the computer in the manner well known per se. Operating the "teach" button, of course, again causes the brush to be raised from the surface of the shoe bottom through the predetermined distance, in readiness for determining the next point of contact.

When digitised information for each point has been obtained in the above manner, the information thus obtained constitutes a set of information from which can be derived the operating path of the tools 168, in an operating mode of the machine, relative to the shoe bottom.

The computer control means of the machine is used for calculating and effecting the compensating x-axis or y-axis movement which takes place in response to y-axis or z-axis movement under operator control, as will now be described with reference to FIGS. 3 and 4. As mentioned above, the appropriate brush 168 is first moved to its start position (step 500) and waits there until a "teach" signal has been generated by an actuation of button 642 (step 502). In response to such actuation the co-ordinate axis values for the start position (constituting an initial starting point of contact between the tool and the workpiece surface) are digitised and stored (step 504). Step 506 enquires as to whether a signal has been generated indicating that the whole of the path determining operating has been completed. In the event of a 'No' answer, the tool 168 is then moved along the z-axis, such movement taking place automatically as a result of the actuation of the "teach" button 642. With the tool 168 in its upper position, the computer then instructs that the "next point establish" routine be carried out (step 510).

The "next point establish" routine is illustrated in FIG. 4. In carrying out this routine, firstly the values for x-axis movement, y-axis movement and z-axis movement, together with a value for the angle a (representing the angular displacement of the tool in response to y-axis movement) are initialised (step 512). Next, the position of the joy stick 646 is monitored as to whether z-axis movement is called for (step 514); it will of course be appreciated that z-axis movement may have a positive or negative value, according to which of the two z-axis directions has been selected. If the answer is in the affirmative, a calculation is made as to whether such movement is "allowed", bearing in mind to that such movement could have the effect of spacing the tool and workpiece surface at a distance greater than the predetermined distance (d) (step 516). If again the answer is in affirmative, then compensating x-axis movement and y-axis movement is calculated (step 518), as will be described in greater detail hereinafter with reference to FIGS. 5 to 7. X-axis, y-axis and z-axis movement is then effected in accordance with the joy stick control and with the calculations (step 520), and further the values for x-axis movement, y-axis movement and z-axis movement are stored (step 522). The next step in the routine is then to monitor the "teach" button 642 (step 524); if the button has been actuated, then the routine is terminated, while if no acutation has taken place, then the routine returns to step 514.

If the answer to step 514 is in the negative, then the joy stick 646 is monitored as to whether y-axis movement is called for (step 526) and again, if the answer is in the affirmative, then enquiry is made as to whether such movement is "allowed" (step 528). If the answer is in affirmative, then the compensating x-axis movement is calculated (step 530), such calculation being described in greater detail hereinafter with reference to FIGS. 5 to 7. The x-axis and y-axis movement is then effected (step 532) in accordance with the joy stick control and the calculation. In addition, the angle a is calculated (step 534), again as described in detail hereinafter with reference to FIGS. 5 to 7, and the values for x-axis movement, y-axis movement and the angle a are then stored (step 536). Thereafter step 524 is followed, monitoring the "teach" button as aforesaid. It will be also noted that, in the event of a negative response to anyone of steps 516, 526 and 528, the status of the "teach" button 642 is monitored (step 524). The routine continues to be followed until such time as the "teach" button 642 is actutated, whereupon the "next point establish" routine is terminated and the "digitise" routine of FIG. 3 is again executed, starting at step 504.

As already mentioned above, initially only z-axis movement can take place when the tool has been moved to its upper position (step 508). In FIG. 5, therefore, a diagram indicates movement of the tool from the "top" of the sphere (point A) along an arc AC (the center of curvature of which is at B), the arc lying in the plane of x-axis movement (represented by BC). $E_1$ represents a first point to which the tool is moved (or the cumulative movement of the tool) from the point A while point $E_2$ represents a further position to which the tool is moved along the arc AC from the point $E_1$.

It will be appreciated that AB, BC, $BE_1$ and $BE_2$ are all equal, and constitute the predetermined distance d. In addition, $AD_1$ represent the amount of z-axis movement under operator control necessary for moving the tool to point $E_1$, and $D_1E_1$ represents the x-axis movement effected automatically to maintain the tool on the arc AC. Similarly, $D_2$ represents a further point to which the tool is moved from $D_1$ to bring the tool to the point $E_2$ from the point $E_1$, and $E_2F$ represents the extra x-axis movement required to maintain the tool on the arc AC.

The relationship between the z-axis movement AD and the x-axis movement DE is determined by the equation $$x = \sqrt{2zd - z^2}$$

where x=DE and z=AD.

For calculating the further movement represented by $E_2F$, the equation must read $$x = \sqrt{2z_2d - z_2^2} - \sqrt{2z_1d - z_1^2}$$

where $x = E_2F$, and $z_1 = AD_1$ and $z_2 = AD_2$.

It will thus be appreciated that for calculating the compensating x-axis movement in response to z-axis movement under operator control, this latter equation is applicable in all instances.

Turning to the calculation of compensating x-axis movement in response to y-axis movement, FIG. 6 shows a circle of radius DE, which is effectively a plan view in a direction of the arrow VI of FIG. 5, sectioned along e.g. the line $D_1E_1$. In FIG. 6 EG represents an arc along which the tool is to be moved, $G_1$ representing a first point to which the tool is moved (or the cumulative movement of the tool) from the point E, and $G_2$ represents a further point to which the tool is to be moved from the point $G_1$.

It will thus be appreciated that $H_1G_1$ represent y-axis movement under operator control, and $H_1E$ represents compensating automatic x-axis movement, while $JG_2$ represents further y-axis movement under operator control, and $H_1H_2$ represents the further compensating x-axis movement required to bring the tool from $G_1$ to $G_2$. The angle $a_1$ represents the angular displacement of the tool from line DE when moved to point $G_1$ and the angle $a_2$ represents the angular displacement of the tool when positioned at the point $G_2$. It will be appreciated that DE is equal to $DG_1$ and $DG_2$.

The compensating x-axis movement is thus calculated by the equation $$x = r - \sqrt{r^2 - y^2}$$

where r represents the radius of the circle (=DE, $DG_1$, $DG_2$) and y=the y-axis movement under operator control. It will of course be appreciated that r is a known value, being the x-axis compensating movement calculated as set out above with reference to FIG. 5.

If further y-axis movement is then effected, the compensating x-axis movement can be calculated by the equation $$x = \sqrt{r^2 - y_1^2} - \sqrt{r^2 - y_2^2}$$

where $y_1$ represents G, H, and $Y_2$ $G_2H_2$.

It will be thus be appreciated that this latter equation is of general use in calculating the compensating x-axis movement in response to y-axis movement.

In general, it is likely that following initial z-axis movement and some y-axis movement thereafter, further z-axis movement will be required in order to bring the tool into contact with the workpiece surface. Where z-axis movement has to take place other than in the plan of the x-axis movement, not only x-axis compensating movement but also y-axis compensating movement must be calculated, as will now be described with reference to FIG. 7. In this Figure, in addition to the arc EG (shown in FIG. 6), a further arc KL is shown, the point K indicating a position to which the tool will be moved in response to further z-axis movement under operator control after the y-axis movement of FIG. 6.

The line KG of FIG. 7 represents an arc corresponding to the arc $E_1E_2$ of FIG. 5, and the equation for calculating the distance $E_2F$ of FIG. 5 can be utilised for calculating the corresponding radial component of movement of the tool from the point G to the point K in response to z-axis movement of the tool from the point G. In this case, however, because the line DK is angularly displaced by the angle a from the x-axis (line DL), the radial component of movement GK must be further divided into x-axis and y-axis movement indicated respectively by the lines GN and KN. The angle a is of course known in that it can be calculated from the relationship y/r (HG/DG) of FIG. 6. Consequently, x-axis movement required in this situation of FIG. 7 can be calculated by the equation $$GN = \cos a \cdot GK$$

and similarly compensating y-axis movement can be calculated by the equation $$KN = \sin a \cdot GK$$

where GN represents the x-axis compensating movement, KN the y-axis compensating movement and GK the radial component of movement indicated in FIG. 5 by the line $E_2F$.

Thus, a general equation for calculating x-axis compensating movement in response to z-axis movement under operator control would read $$x = \cos \underline{a} \left( \sqrt{2z_2 d - z_2^2} - \sqrt{2z_1 d - z_1^2} \right)$$

and similarly a general equation for calculation of compensating y-axis movement in response to z-axis movement under operator control would read $$y = \sin \underline{a} \left( \sqrt{2z_2 d - z_2^2} - \sqrt{2z_1 d - z_1^2} \right)$$

It will thus be appreciated that in the case of z-axis movement under operator control, the tool will follow a great circle of the sphere, such circle being angularly displaced from the x-axis by the angle a, while in the case of y-axis movement under operator control, the tool will follow a small circle of such sphere, such small circle lying in a plane which is normal to the z-axis. (In passing, the radius of the great circle is always d, while the radius of the small circle is r, representing the cumulative x-axis movement effected in response to z-axis movement under operator control.)

The predetermined distance (radius of the great circle) d may be pre-set. Alternatively, it may be selected, from a pre-set range, by the operator for each digitising operation. Such setting by the operator is facilitated especially where an interactive computer control is provided whereby, each time a negative response is given to step 524 (FIG. 4), the operator is invited to set the value "d" for the next digitising step. Varying the setting of the predetermined distance d is of course effective, in the operating mode of the machine, to vary the speed at which the tool 168 is caused to operate along the workpiece surface.

It will thus be appreciated that, in using the method in accordance with the invention, a relatively straightforward and efficient way is provided of moving a tool from one digitised point to determine the next-to-be digitised point regardless of the contour of the surface along which the points are to be determined. The manner in which the points are digitised is not the subject of the present application; any convenient way which is in general practice may be used for carrying out the digitising step itself. Similarly, although the movement along the three axes as described herein is under the control of stepping motors, any numerically controlled motor could be used for the purpose; for example d.c. servo motors could be utilized.

We claim:

1. In a method of determining an operating path of a tool in relation to a surface of a workpiece wherein a plurality of points of contact between a tool and the workpiece surface are determined and information in the form of digitised co-ordinate axis values relating to each determined point of contact is stored in a computer memory device, from which set of co-ordinate axis values an operating path for the tool can be derived, the improvement consisting in a method for controlling the spacing between adjacent points, said method comprising the steps of:

(i). starting from a point of contact, constituted by a last preceding stored point, of the tool and the workpiece surface, effecting relative movement between the tool and the workpiece surface out of such contact through a predetermined distance along a first axis, and thereafter (ii). maintaining the tool at said predetermined distance from said starting point of contact while returning the tool and the workpiece surface into contact, which return movement is effected selectively (a) along said first axis, whereupon compensating relative movement is caused to take place automatically along a second axis and/or a third axis such that the tool describes a great circle of a sphere of which the starting point of contact forms the center, or (b) along said third axis, whereupon compensating relative movement is caused to take place automatically along said second axis such that the tool describes a small circle of such sphere, such return movement being terminated when the next-to-be-stored point of contact of the tool and the workpiece surface is reached, which point of contact is thus spaced at the predetermined distance from the starting point of contact, regardless of the contour of the workpiece surface.

2. The method of claim 1 wherein as the tool and the workpiece surface are urged into contact with one another a predetermined load is applied thereto.

3. The method of claim 2 wherein the predetermined load is constant for each point.

4. The method of claim 1 wherein the predetermined distance is set by the operator for each next-to-be-digitised point.

5. The method of claim 1 wherein the workpiece surface is constituted by a shoe bottom and the first axis extends heightwise, the second lengthwise and the third widthwise thereof.

* * * * *